United States Patent [19]
Ando et al.

[11] Patent Number: 5,472,389
[45] Date of Patent: Dec. 5, 1995

[54] HYDRAULIC CONTROL SYSTEM FOR AUTOMATIC TRANSMISSION

[75] Inventors: Masahiko Ando, Okazaki; Akira Fukatsu; Yoshihisa Yamamoto, both of Anjo; Mamoru Niimi, Hanada; Kunihiro Iwatsuki, Toyota; Hiromichi Kimura, Okazaki; Hidehiro Oba, Aichi; Yasuo Hojo, Nagoya; Masato Kaigawa, Toyota, all of Japan

[73] Assignees: Aisin AW Co., Ltd.; Toyota Jidosha Kabushiki Kaisha, both of Japan

[21] Appl. No.: 253,008

[22] Filed: Jun. 2, 1994

[30] Foreign Application Priority Data

Jun. 3, 1993 [JP] Japan ................................ 5-156396

[51] Int. Cl.$^6$ ........................................... F16H 61/12
[52] U.S. Cl. ..................... 477/130; 477/131; 477/142; 477/906; 475/116; 475/122; 475/128
[58] Field of Search ........................... 475/116, 119, 475/121, 122, 127, 128; 477/130, 131, 134, 142, 143, 149, 906

[56] References Cited

U.S. PATENT DOCUMENTS

| | | | |
|---|---|---|---|
| 3,868,866 | 3/1975 | Lentz | 475/116 |
| 4,713,989 | 12/1987 | Hayakawa et al. | 74/869 |
| 4,817,474 | 4/1989 | Morisawa | 477/906 |
| 4,942,787 | 7/1990 | Aoki et al. | 74/867 |
| 5,079,970 | 1/1992 | Butts | 74/858 |
| 5,109,734 | 5/1992 | Fujiwara | 475/116 |

FOREIGN PATENT DOCUMENTS

| | | |
|---|---|---|
| 63-96345 | 4/1988 | Japan. |
| 1224553 | 9/1989 | Japan. |
| 237128 | 2/1990 | Japan. |
| 4175567 | 6/1992 | Japan. |

Primary Examiner—Charles A. Marmor
Assistant Examiner—Sherry Lynn Estremsky
Attorney, Agent, or Firm—Lorusso & Loud

[57] ABSTRACT

A hydraulic control for an automatic transmission is composed of a gear shift mechanism having first and second frictional engagement elements, a hydraulic control unit for the engagement elements, and an electronic control unit for the hydraulic control unit. The first element is engaged to achieve a first speed stage and the second element is engaged to achieve a second speed stage faster than and closest to the first speed stage. The hydraulic control unit has a first directional control valve for switching the feeding and discharge of hydraulic pressure between the first and second engagement elements, responsive to a first solenoid signal from the electronic control unit. A second directional control valve is adapted to be switched by a second solenoid signal from the electronic control unit to achieve a third speed stage yet faster than the second speed stage. The first engagement element has a discharge line connected to a drain line via the second directional control valve. The electronic control unit has a detector for determination of tie-up of either or both of the engagement elements, whereby upon detection of tie-up by the detector, the second solenoid signal is output to the second directional control valve.

7 Claims, 7 Drawing Sheets

|     | C-0 | C-1 | C-2 | B-0 | B-1 | B-2 | B-3 | B-4 | F-0 | F-1 | F-2 |
|-----|-----|-----|-----|-----|-----|-----|-----|-----|-----|-----|-----|
| N   |     |     |     | ◌   |     |     |     |     |     |     |     |
| Rev.|     |     | ○   | ○   |     |     |     | ○   |     |     |     |
| 1st | ○   | ○   |     |     |     |     |     | ●   | ○   |     | ○   |
| 2nd | ●   | ○   |     |     |     |     | ○   |     | ○   |     |     |
| 3rd | ○   | ○   |     |     | ●   | ○   |     |     | ○   | ○   |     |
| 4th | ○   | ○   | ○   |     |     | ◎   |     |     | ○   |     |     |
| 5th |     | ○   | ○   | ○   |     | ◎   |     |     |     |     |     |

Number of Revolutions of Input shaft $N_T$

Torque of Output Shaft $T_O$

Touque on Released Side $T_{Re}$

Pressure on Release Side $P_{Re}$

Pressure on Applied Side $P_{Ap}$

Heat Capacity on Applied Side $Q_{Ap}$

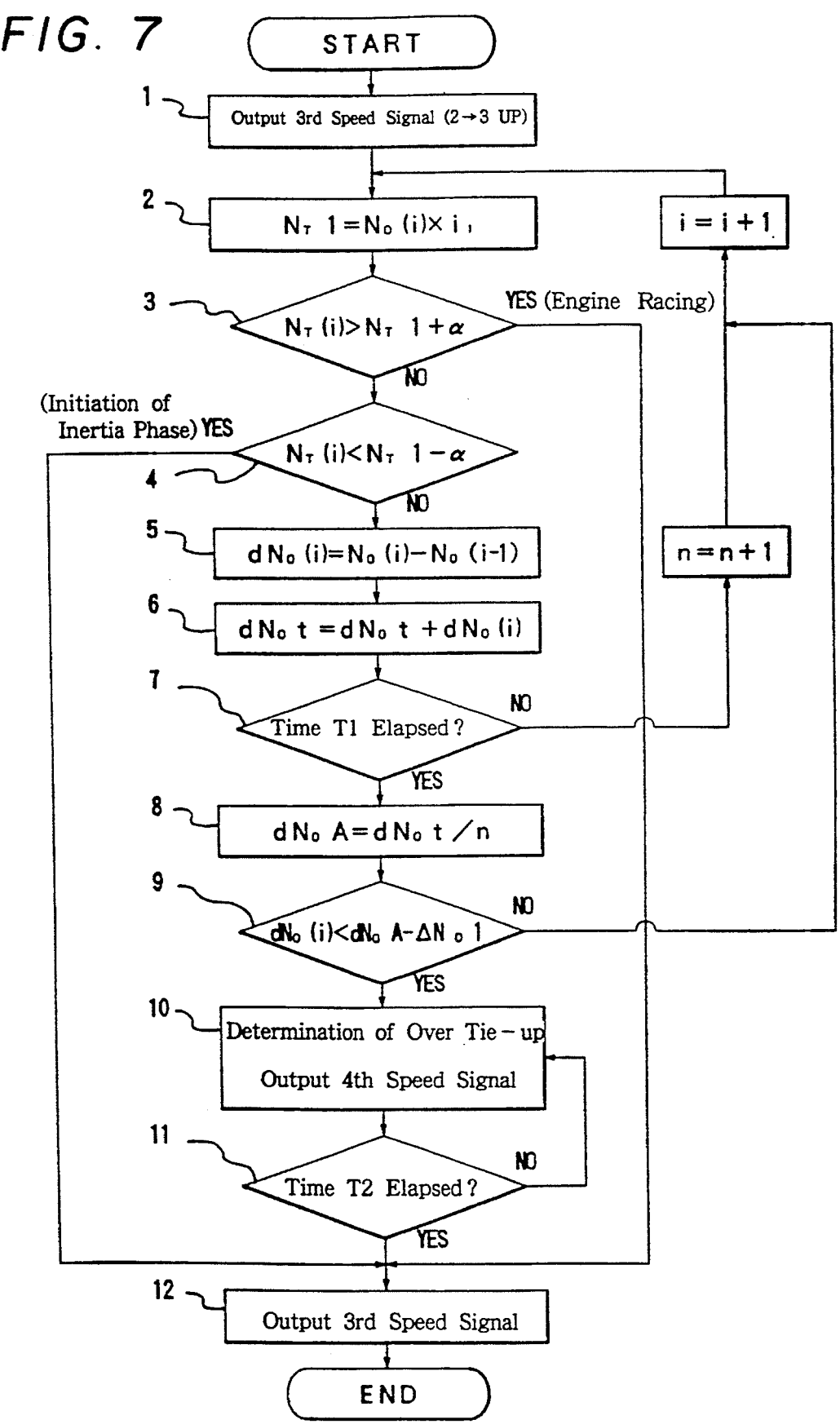

HYDRAULIC CONTROL SYSTEM FOR AUTOMATIC TRANSMISSION

BACKGROUND OF THE INVENTION

1) Field of the Invention

This invention relates to an automatic transmission, and especially to a hydraulic control system for engaging or releasing frictional engagement elements in a gear shift mechanism to shift the automatic transmission.

2) Description of the Related Art

In an automatic transmission, it has heretofore been needed, in some instances, to simultaneously perform engagement and/or release of two frictional engagement elements, in other words, so-called gear change operations upon shifting between particular speed stages. In such instances, the torque of an output shaft suddenly drops due to tie-up or engine racing occurs due to an underlap, unless the timing of the operations is appropriately controlled. With a view toward avoiding such problems, it has heretofore been the common practice to arrange one-way clutches in parallel with the respective frictional engagement elements so that while using the one-way clutches for releasing the corresponding frictional engagement elements, the timing of the gear change operations is automatically well maintained by controlling hydraulic pressure only for the engaging operations.

On the other hand, elimination of the above one-way clutches is desirable so that the gear shift mechanism can be more compactly constructed. One example of such a compact construction is disclosed in Japanese Patent Application Laid-Open (Kokai) No. HEI 1-224553 for shifting between the 2nd speed and the 3rd speed (hereinafter abbreviated as "2–3 shift"). This applies equally to other shifts and the 3–4 shift is effected without one-way clutches. In this transmission, to precisely control gear change operations of the corresponding frictional engagement elements (the clutches in this example) for a 2–3 shift, a timing valve is arranged in a hydraulic control system so that feeding of hydraulic pressure to both the clutches and discharge of hydraulic pressure from both the clutches can be conducted by a single directional control valve. Further, to ensure the above shift even if the valve should become inoperative due to sticking or the like, the hydraulic pressure on each discharge side can still be drained separately through an oil line, which is arranged in parallel with the directional control valve, via a small-diameter orifice.

However, in the system disclosed in the above patent publication, there is obviously a limitation on the amount of hydraulic pressure which can be discharged through the small-diameter orifice so that the system cannot prevent tie-up in the event of a failure of the directional control valve. If such tie-up takes place, a large shift shock occurs and, moreover, the heat load (transmitted torque×revolution number) on the engaging frictional engagement elements (clutches) becomes extremely large, resulting in a substantial reduction of the durability.

SUMMARY OF THE INVENTION

An object of the present invention is therefore to provide a hydraulic control system for an automatic transmission, omitting some one-way clutches to make a compact gear shift mechanism, which hydraulic control system can perform engagement or release of each frictional engagement element without over tie-up, even when a directional control valve malfunctions.

In one aspect of the present invention, there is provided a hydraulic control system for an automatic transmission, which hydraulic control system includes a gear shift mechanism having a first frictional engagement element adapted to be engaged to achieve a particular first speed stage and a second frictional engagement element adapted to be engaged to achieve a second speed stage faster than and closest to the first speed stage, a hydraulic control unit for controlling engagement and release of the first and second frictional engagement elements of the gear shift mechanism by feeding hydraulic pressure thereto or discharging hydraulic pressure therefrom, and an electronic control unit for controlling the hydraulic control unit by solenoid signals. The hydraulic control unit includes a first directional control valve for switching feeding and draining of hydraulic pressure between the first and second frictional engagement elements, responsive to a first solenoid signal output from the electronic control unit, and a second directional control valve adapted to be switched by a second solenoid signal output from the electronic control unit to achieve a third speed stage which is faster than second speed stage. The first frictional engagement element has a discharge line connected to a drain line via the second directional control valve. The electronic control unit has tie-up detection means for determining tie-up of either of the frictional engagement elements, on the basis of a detection signal from gear shift sensor means whereby, upon detection of tie-up by the tie-up detection means, the second solenoid signal is output to the second directional control valve.

In the control system of the present invention as described above, a second solenoid signal is output to the second directional control valve when both of the frictional engagement elements are determined by the tie-up detecting means to have undergone over tie-up. As a result, the first frictional engagement element has its hydraulic pressure discharge connected to the drain line via the second directional control valve, so that the pressure released from the first frictional engagement element is promptly drained from the discharge line via the second directional control valve, irrespective of operation of the first directional control valve. Consequently, over tie-up between frictional engagement elements for the first and second speed stages can be avoided even if the first directional control valve malfunctions.

By omission of the one-way clutches which are conventionally provided in parallel with frictional engagement elements for establishing the first and second speed stages, the present invention has made it possible to engage or release these frictional engagement elements without occurrence of over tie-up, even if the directional control valves which control these gear change operations malfunction. This has made it possible to reduce shift shocks, by avoiding drops in the torque of an output shaft due to tie-up, and also to improve the durability of the frictional engagement elements by reducing the heat load on them.

BRIEF DESCRIPTION OF THE DRAWINGS

FIG. 7 is a flow chart of control responsive to a signal from the tie-up detecting means.

DETAILED DESCRIPTION OF THE INVENTION AND PREFERRED EMBODIMENT

Figure 1:
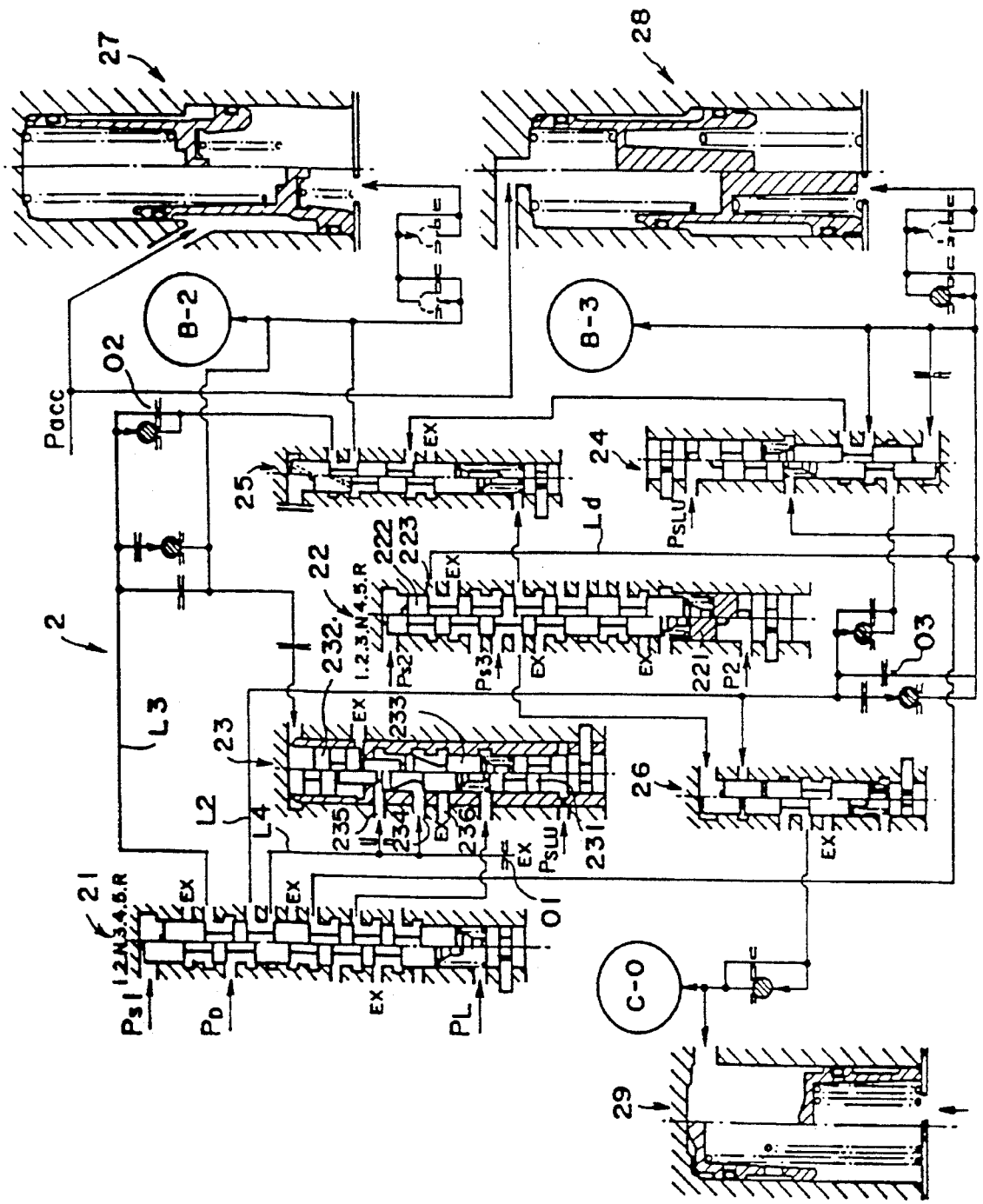
FIG. 1 is a fragmentary circuit diagram of a hydraulic control system according to one embodiment of the present invention, which is suited for use in an automatic transmission.
Figure 2:
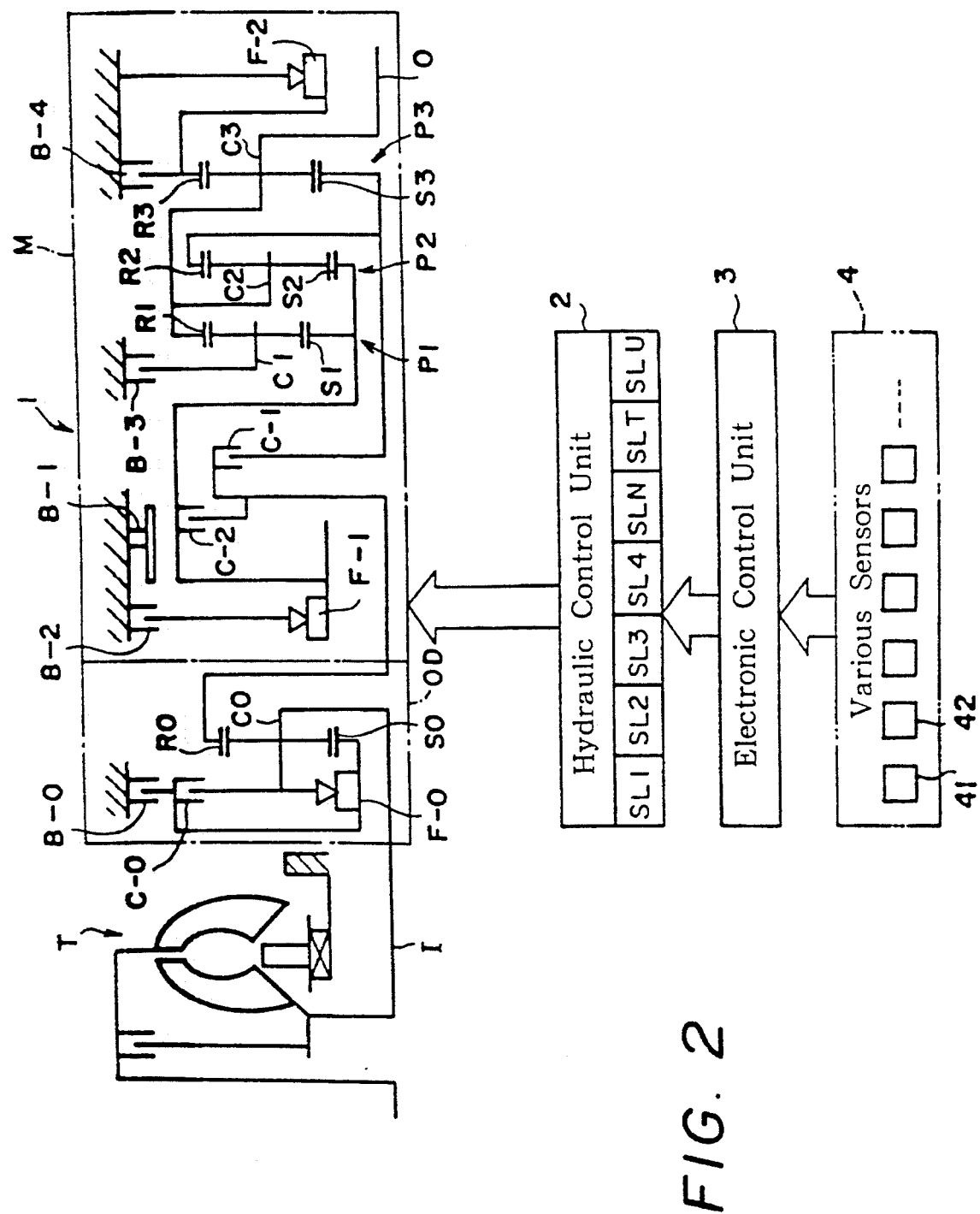
FIG. 2 is a schematic diagram of the overall construction of the automatic transmission, showing a gear shift mechanism portion in skeleton and the remaining portion in blocks.

FIGS. 1 through 8 show one embodiment of this invention. As shown in FIG. 2, the automatic transmission includes a gear shift mechanism having a first frictional engagement element (a brake in this embodiment) B-3 adapted to be engaged to achieve a first specific speed stage (the 2nd speed in this embodiment) and a second frictional engagement element (another brake in this embodiment) B-2 adapted to be engaged to achieve a second specific speed stage (the 3rd speed in this embodiment) which is higher than and closest (next adjacent) to the first specific speed stage. A hydraulic control unit 2 controls engagement and release of the brakes B-3 and B-2 of the gear shift mechanism by feeding hydraulic pressure thereto or draining hydraulic pressure therefrom. An electronic control unit (ECU) 3 controls the hydraulic control device by solenoid signals. The electronic control unit 3 is provided with a group of various sensors 4, in association with various rotary elements in the gear shift mechanism, so that the state of the gear shift mechanism can be monitored.

As is illustrated in FIG. 1, the hydraulic control unit 2 has, in its hydraulic circuit, a first directional control valve 23 (a 2–3 timing valve in this embodiment) and a second directional control valve 22 (a 3–4 shift valve in this embodiment). The first directional control valve 23 is switched upon application of hydraulic pressure thereto from a 2–3 shift valve 21 which is, in turn, switched by a first solenoid signal (namely, a 3rd speed signal) output from the electronic control unit 3 to a solenoid valve SL1. On the other hand, the second directional control valve 22 is switched by a second solenoid signal output from the electronic control unit 3 to a solenoid valve SL2 to achieve the 4th speed.

According to the present invention, the first frictional engagement element (the brake in this embodiment) B-3 is connected to a discharge line Ld and to a drain line via the second directional control valve (the 3–4 shift valve in this embodiment) 22. The electronic control unit 3 has tie-up detecting means for detecting tie-up of either or both of the frictional engagement elements (the brakes in this embodiment) on the basis of detection signals from the sensors 4, which are arranged to detect gear shifts in the gear shift mechanism 1 (see FIG. 4), processed by a program stored in the electronic control unit 3. Responsive to a signal from the tie-up detecting means, a second solenoid signal (namely, a "4th signal") is output to the second directional control valve (the 3–4 shift valve in this embodiment) 22.

As is depicted in FIG. 2, the gear shift mechanism 1 has, in the illustrated embodiment, a 5-speed construction which is a combination of a secondary shifting unit OD in the form of an input side overdrive planetary gear unit ("the planetary gear unit" will hereinafter be abbreviated as "the gear unit" in the description of the embodiment) and a 4-forward/1-reverse primary shifting unit M in the form of an in-line train of three planetary gear sets.

In addition to the secondary shifting unit OD and the primary shifting unit M described above, the gear shift mechanism 1 is also provided with a torque converter T equipped with a lockup clutch. The secondary shifting unit OD is equipped with a one-way clutch F-O in association with a sun gear SO, a carrier CO and a ring gear R0, a multi-plate clutch C-O arranged in parallel with the one-way clutch F-O, and a multi-plate brake B-O arranged in series with the multi-plate clutch C-O. The primary shifting unit M, on the other hand, is provided with an in-line train of three sets of gear units P1–P3 suitably connecting in series various shifting elements including sun gears S1–S3, carriers C1–C3 and ring gears R1–R3. Arranged in association with the shifting elements of the respective gear units are multi-plate clutches C-1,C-2, a band brake B-1, multi-plate brakes B-2 to B-4 and one-way clutches F-1,F-2. Although not illustrated in the drawings, the clutches and brakes are each provided with servo means having a piston which either engages or releases a friction element of the corresponding clutch or brake, under control of servo hydraulic pressure.

Figures 3, 4:
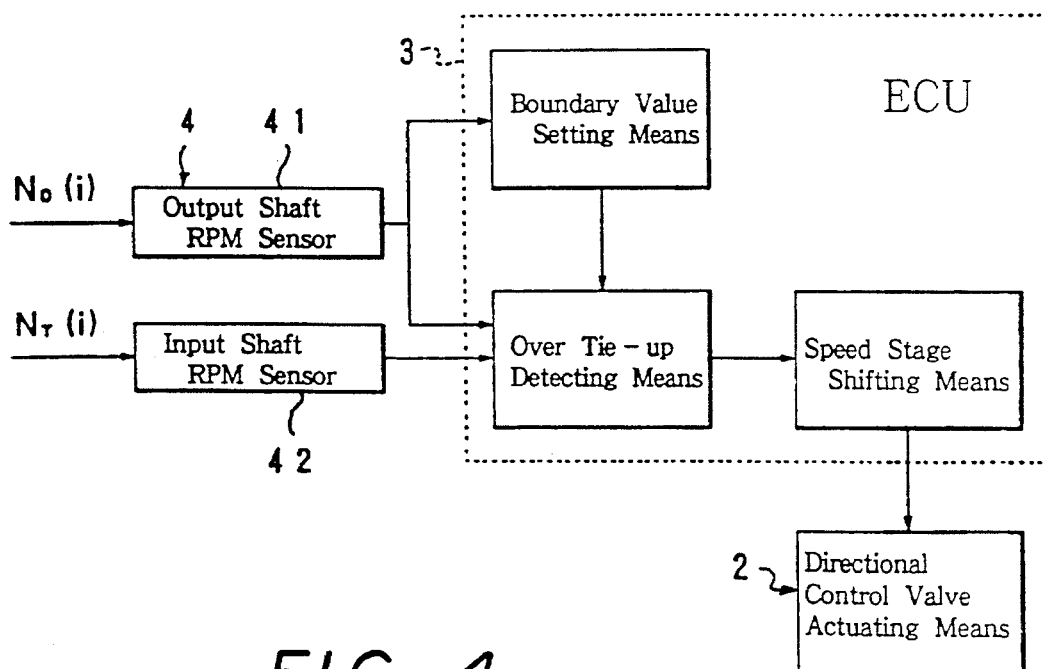
FIG. 3 is a table of frictional engagement elements of the automatic transmission, indicating the speed stages in which they engage.
FIG. 4 is a block diagram of a tie-up detecting means in the automatic transmission.
Figure 5A:
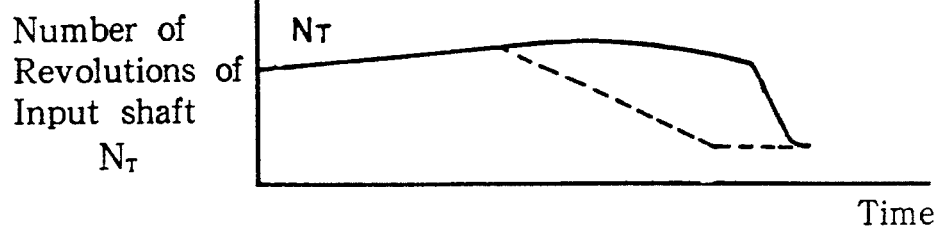
FIG. 5 is a graph of shift characteristics of the automatic transmission.
Figure 5B:
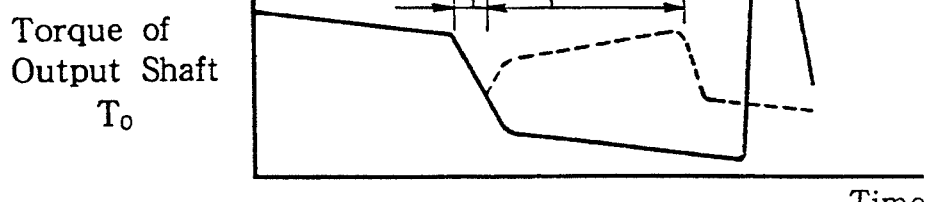
Figure 5C:
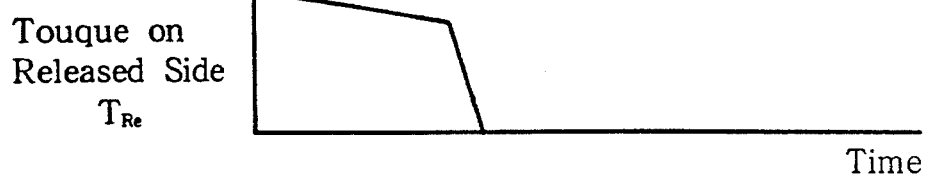
Figure 5D:
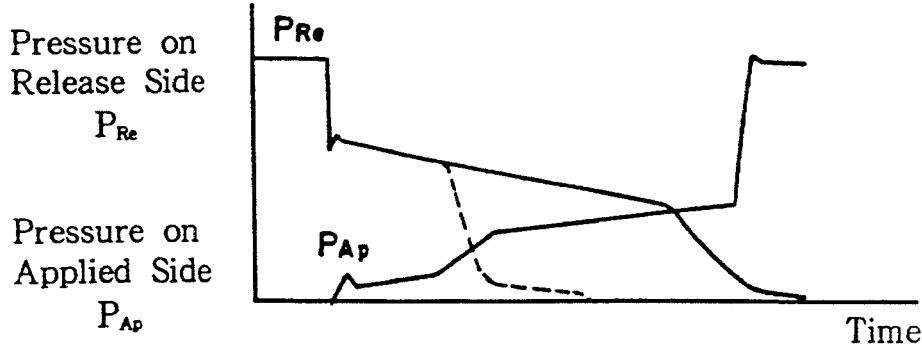
Figure 5E:
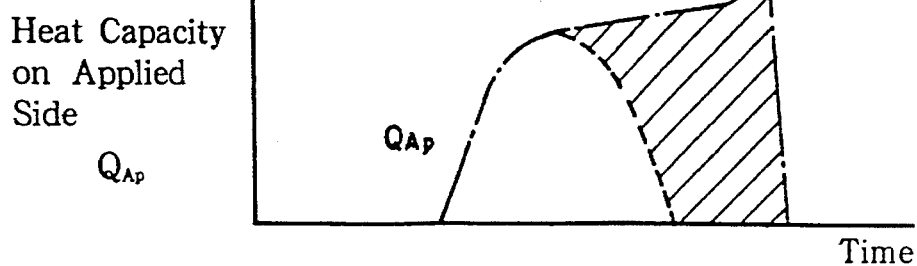

In the above gear shift mechanism, rotary input from an engine (not shown) is transmitted via the torque converter T to an input shaft I of the secondary shifting unit OD. When the clutch C-0 is engaged to lock up the secondary shifting unit OD, the clutch C-1 of the primary shifting unit M is engaged and the other frictional engagement elements are all released as illustrated in FIG. 3, rotation of the input shaft I is, in turn, transmitted to the sun gear S3 of the gear unit P3 and, as a result of prevention of reverse rotation of the ring gear R3 by the one-way clutch F-2, is then output as 1st speed rotation from the carrier C3 to an output shaft O.

2nd speed is achieved when the secondary shifting unit OD has been locked up and the clutch C-1 and the brake B-3 (the first frictional engagement element in the present invention) have engaged. At this time, an input transmitted to the ring gear R2 of the gear unit P2 is output to the carrier C2 of the gear unit P2 and hence to the ring gear R1 of the gear unit P1, the ring gear R1 being connected directly to the carrier C2, while using the carrier C1 of the gear unit P1 as a reaction force element.

3rd speed is achieved when the secondary shifting unit OD has been similarly locked up, the clutch C-1 and the brake B-2 (the second frictional engagement element in the present invention) have engaged and the other frictional engagement elements have been released. At this time, input transmitted to the ring gear R2 of the gear unit P2 is output to the carrier C2 while using the sun gear $2 as a reaction force element.

4th speed is achieved when the secondary shifting unit OD has been similarly locked up and both the clutches C-1 and C-2 have engaged. At this time, the rotation is input to the ring gear R2 and also to the sun gear S2 so that the gear unit P2 is locked up so that output equals the input.

5th speed is achieved by maintaining the primary shifting unit M in the same state as for the 4th speed, releasing the clutch C-0, engaging the brake B-0 to fix the sun gear SO and causing the secondary shifting unit OD to rotate at an increased speed. On the other hand, a reverse range is achieved by maintaining the secondary shifting unit OD in the above-described state and engaging the clutch C-2 and brake B-4 of the primary shifting unit M. At this time, input transmitted to the sun gear S2 of the gear unit P2 is output as reverse rotation of the carriers C2,C3 of the gear units P2,P3 while using the ring gear R3 as a reaction force element.

Since the hydraulic control system of the present invention utilizes, in general, conventional components, except for the parts shown in FIG. 1 which pertain to the subject matter of the present invention, its overall description and illustration are omitted here. For example, a complete gear shift circuit for controlling engagement and release of the individual frictional engagement elements, namely, the brakes and clutches in the gear shift mechanism, would include shift valves corresponding to the respective speed stages, including the above-described shift valves, between a manual valve for receiving a supply of line pressure and servo means for the individual frictional engagement elements.

A complete hydraulic control circuit would also include a pressure control valve for producing a regulated SLN output signal pressure. The terminology "an output signal pressure" refers to a signal pressure produced without drainage by a linear solenoid valve SLN, based on the range pressure during shifting (base pressure), to produce a control pressure. The complete hydraulic control circuit would further include an engine brake relay valve for switching feeding/discharge of line pressure with respect to the clutch C-O, a C-O exhaust drain 26 for switching feeding/discharge of line pressure with respect to the clutch C-O, a solenoid valve SL1 for outputting a switching signal pressure to the 2–3 shift valve 21, a solenoid valve SL2 for outputting a switching signal pressure to the 1–2 shift valve, a solenoid valve SL3 for outputting a switching signal pressure to the C-O drain valve 26 via the 1–2 shift valve, a solenoid valve SL4 for outputting a switching signal pressure to the C-O drain valve 26, and a linear solenoid valve SLN for outputting a signal pressure for the regulation of the pressure control valve. The individual brakes other than the brakes B-1 and B-4 are further provided with individual accumulators. The symbol SLU in FIG. 2 indicates a solenoid valve for outputting lockup signals.

The 2–3 timing valve 23 is a pressure regulator which has a spool 233 with one end in contact with a piston 231 via a spring and an opposite end in contact with a plunger 232. The piston 231 receives a solenoid signal pressure $P_{SLU}$ from the solenoid valve SLU and a control pressure via the 2–3 shift valve 21 in opposition to $P_{SLU}$, while the pressure of a line L3 is received by the plunger 232. A pressure regulation port 234 and a signal port 235 of the timing valve 23 are connected to a line L4, and the line L4 is connected to the drain line through a small-diameter orifice 01.

The 2–3 shift valve 21 is a directional control valve having a spring-loaded spool. By applying a signal pressure Ps1 from the solenoid valve SL1 and an L range pressure $P_L$, switching of a D range pressure $P_D$ between the line L2 and the line L3, as well as switching of communication of the line L2 to the line L4, etc. are effected.

The 3–4 shift valve 22 is a directional control valve having a spool 222 spring-loaded via a piston 221, and receives at one end thereof a signal pressure Ps2 from the solenoid valve SL2. Responsive to 2-range pressure and the D range pressure, received via the shift valve 21, the 3–4 shift valve 22 either transmits or cuts off a signal pressure from the solenoid valve SL3 to the 4–5 shift valve, opens or shuts off the line to/from the clutch C-2, and feeds or discharges a control pressure to/from the brake B-2. The 3–4 shift valve 22 is also provided with a port 223 which is connected to a discharge line Ld which relates to the improvement embodied in the present invention. This port 223 is either blocked from or connected to the drain line as a result of movement of the spool 222.

In the diagram, there are also shown a B-3 control valve 24, a B-2 orifice control valve 25, a C-0 drain valve 26, a B-2 brake accumulator 27, a B-3 brake accumulator 28, and a C-0 clutch accumulator 29. They are not directly related to the subject matter of the present invention so a specific description of their construction and action is omitted here. The different positions of each valve, shown on opposite sides of a center line, represent limits of displacements of the associated spool. In the case of the shift valves, the left and right side spool positions are correlated with the corresponding gear positions.

FIG. 4 illustrates one example of a suitable tie-up detecting means for detecting tie-up by monitoring rotation of the output shaft and rotation of the input shaft. The illustrated tie-up detecting means includes an output shaft rotation sensor 41 which detects the number $[N_O(i)]$ of output revolutions from the output shaft 0, an input shaft rotation sensor 42 for detecting the number of input revolutions $[N_T(i)]$ from the input shaft I, electronic control unit 3, and directional control valve actuating means (specifically, the solenoid valve SL2 in the hydraulic control unit 2). The electronic control unit 3 includes, as a program, over tie-up detecting means, boundary value setting means and speed stage switching means.

In the automatic transmission described above, the respective clutches and brakes in the gear shift mechanism, not individually described, are controlled as shown in FIG. 3 according to mechanical selection by positioning of the manual valves 2 in the hydraulic control unit 2 and regulation of range pressures and switching on/off of the solenoid valves SL1–SL4 by electronic control corresponding to the vehicle speed and engine load (for example, the throttle opening), whereby in association with the one-way clutches, the respective gear stages are obtained and the engine brake is actuated in accordance with the gear stages. In the diagram, O indicates "engaged" ● "engaged upon application of an engine brake", ⊙ "engaged but irrelevant to the transmission of power", and others "released".

In this automatic transmission, the 2–3 shift valve 21 shown in FIG. 1 is in the left-half position in 2nd speed, so that a D range pressure $P_D$, corresponding to the position of the manual valve, is fed to the brake B-3 through the 2–3 shift valve 21, the line L2 and the orifice 03 and the accumulator 28 is in a charged state. At this time, the discharge line Ld is blocked by a land of the spool 222 which is in the left-half position in the 3–4 shift valve 22, and is thereby cut off from the drain line.

When a 3rd speed signal is output in this state (2nd speed), the 2–3 shift valve 21 is switched to the right-hand position. As a result, the D-range pressure $P_D$ is fed to the brake B-2 and the accumulator 27 via the line L3, orifice 02 and the B-2 orifice control valve 25. At the same time, the line L2 is brought into communication with the line L4 so that drainage of hydraulic pressure from the brake B-3 and its accumulator 28 begins. If the 2–3 timing valve 23 is operating properly at this time, the pressure fed to the brake B-2 is applied to the plunger 232 and the spool 233 and the pressure of the brake B-3 is discharged primarily through a drain port 236 under regulation by the spool 233. During the 2–3 shift, the operation of transmission components is as shown by dashed lines in FIG. 5, in which $N_T$ indicates the number of revolutions of the input shaft, $T_O$ the torque of the output shaft, $T_{Re}$ the torque on the released side, $P_{Re}$ the pressure on the released side, $P_{Ap}$ the pressure on the applied (engaged) side, and $q_{Ap}$ the heat capacity on the applied side.

If the 2–3 timing valve 23 malfunctions due to sticking or the like, the spool 233 does not move downward to the right-hand position shown in FIG. 1, thereby failing to provide smooth discharge drainage as described above. Drainage therefore takes place through the small-diameter orifice 01, so that tie-up as indicated by a solid line in FIG. 5 occurs. In this indicated tie-up state, the input revolution number $N_T$ does not drop after the torque phase $F_T$ and, as a result, the applied-side heat $q_{Ap}$ increases as indicated by an alternate long and short dash line so that—compared with the heat received when the 2–3 timing valve 23 functions properly as indicated by a dashed line—an excess thermal load is imposed as indicated by hatching. In this embodiment of the present invention, therefore, upon output of a 4th speed signal from the speed stage switching means of the electronic control unit 3, the 3–4 shift valve 22 is switched, to the position shown in the right-half portion in the drawing, by a solenoid signal pressure $P_{S2}$ produced when the directional control valve actuating means, i.e., the solenoid valve SL2, is turned off.

Details of this shifting operation are illustrated in the flow chart of FIG. 7. First, in step 1, a 3rd speed solenoid signal is output upon determination of an upshift to the 3rd speed. In other words, the solenoid SL1 is turned off and the 2–3 shift valve 21 is switched to the right-half position shown in FIG. 1. Next, in step 2, an input revolution number $N_T1$ is calculated by multiplying the output revolution number $N_o(i)$ at the time of i by 2nd speed gear ratio $i_1$. Using the input revolution number $N_T1$ obtained above in step 2, the input revolution number $N_T(i)$ at the time of i detected by the input shaft revolution sensor 42 and a constant $\alpha$ (for example 50 rpm), it is then determined in step 3 whether or not engine racing (premature release of an engagement element on the released side) has occurred. In step 4, it is similarly determined whether or not an inertia phase $F_1$ has initiated. When neither engine racing nor initiation of the inertia phase $F_1$ is determined, angular acceleration (a change in the revolution number) $dN_O(i)$ is determined in step 5. In step 6, the total angular acceleration $dN_Ot$ is determined from the output of the 2–3 upshift signal. In step 7, the preceding steps 2–7 are repeated in a loop until time $T_1$, started upon production of a 3rd speed output, has elapsed. When the time $T_1$ has elapsed, an average value dNA is determined in step 8 by using the value obtained in step 6. Using the angular acceleration $dN_O(i)$ at the time of i, the total angular acceleration $dN_Ot$ and a constant (a boundary value for the determination of tie-up) $\Delta N_O1$ (the manner of determination will be described subsequently herein), it is then determined in step 9 whether or not over tie-up has occurred. In step 10 and step 11, when over tie-up is determined in step 9, time $T_2$ is started and, until the time $T_2$ elapses, the solenoid valve SL2 is maintained off to output a 4th speed signal. In step 12, the speed signal is returned to the 3rd speed signal.

Figure 8A:
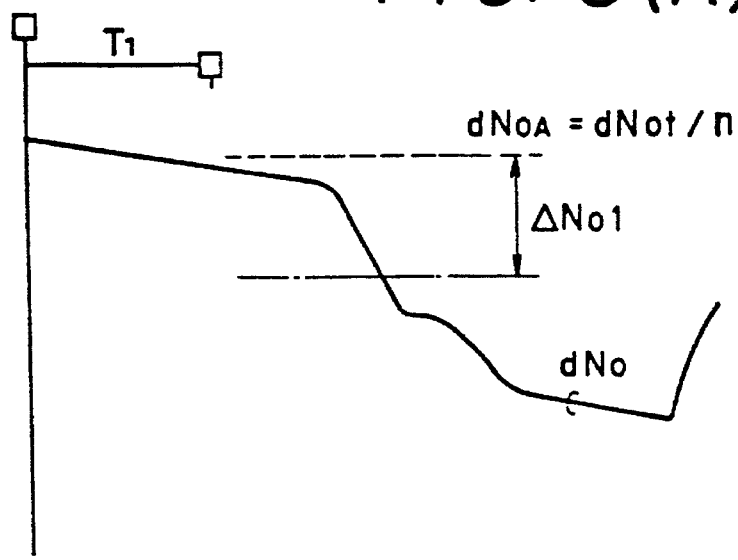
FIGS. 8(A) to 8(C) are graphs illustrating the setting of a boundary value by boundary value setting means.
Figure 8B:
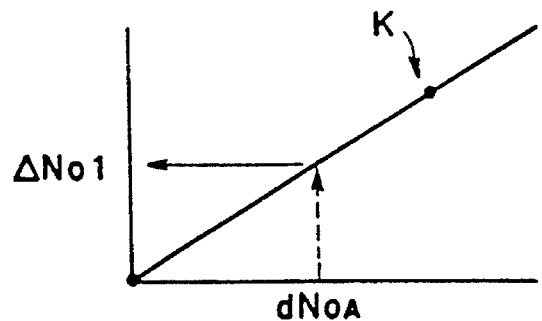
Figure 8C:
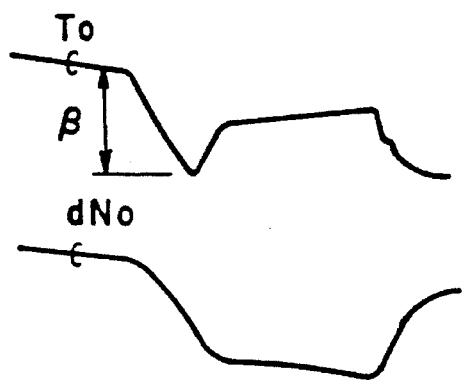

The manner in which the boundary value $\Delta N_O1$ is determined by the boundary value setting means will now be described. In step 9 of the above control program the relationship between the time $T_1$ and the angular acceleration (a change in the revolution number) $dN_O$ can be illustrated as shown in FIG. 8(A). Occurrence of over tie-up is determined when the average acceleration $dN_OA$ (=$dN_Ot/$n) during the time $T_1$ has exceeded the boundary value $\Delta N_O1$. Here, the angular acceleration $dN_O$ in the gear shift mechanism is obtained from a drop $\beta$ in the torque phase $F_T$ of the output shaft torque $T_O$, as depicted in FIG. 8 (C), because, in the torque phase $F_T$, a drop $\beta$ in the output shaft torque $T_O$ is determined from input torque (the output shaft torque $T_O$ is proportional to the input torque) and the angular acceleration $dN_O$ is proportional to the output shaft torque $T_O$. The boundary value $\Delta N_O1$ for the average acceleration $dN_OA$ is set according to a proportional relationship which is based on a constant K obtained by actual measurement of changes in the revolution number by physical testing [see FIG. 8(B)].

Figure 6A:
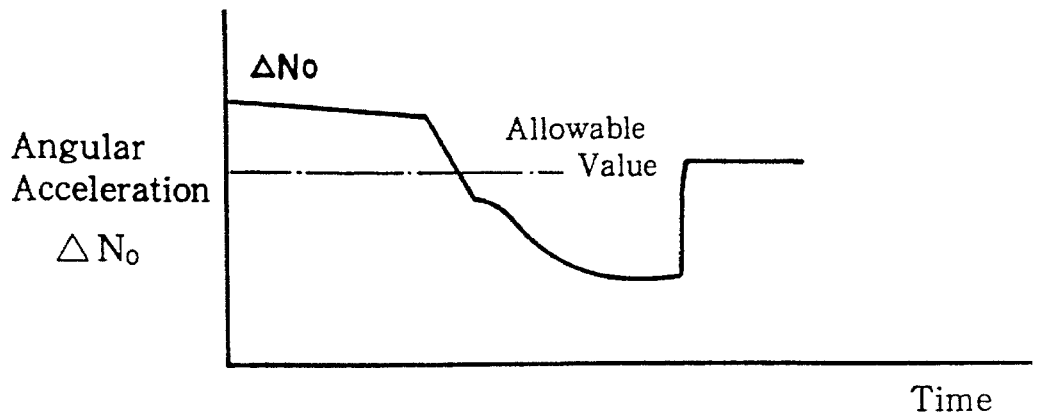
FIG. 6 is a graph of shift characteristics upon occurrence of tie-up.
Figure 6B:
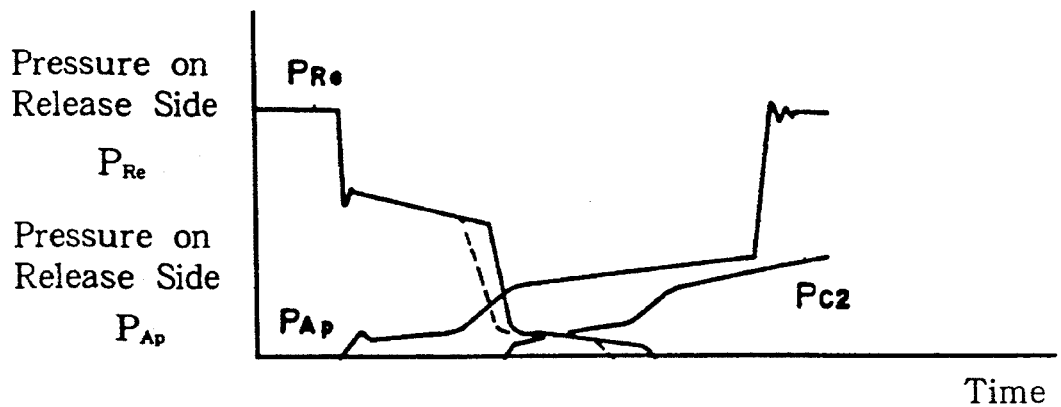
Figure 6C:
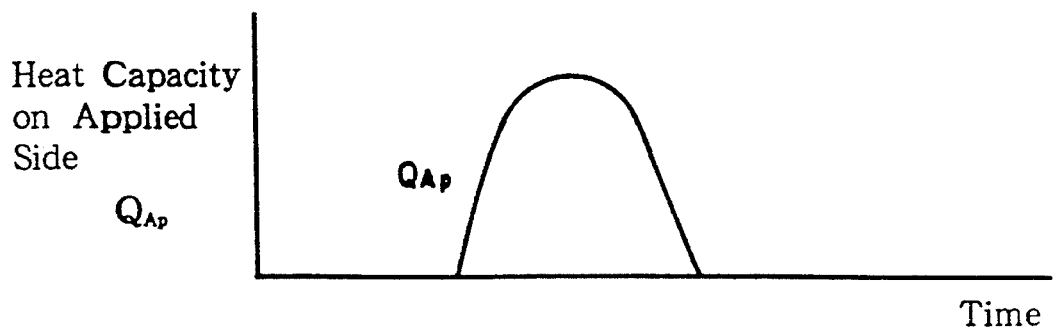

By control as described above, a shift characteristic as represented by a solid line in FIG. 6 is obtained, whereby shifting substantially comparable to the characteristic pattern for proper operation of the 2–3 timing valve as indicated by the dashed line, is assured. Needless to say, upon output of a 4th speed signal as described above, the circuit of the hydraulic control device 2 is switched to the state of the 4th speed and engagement of the clutch C-2 is attempted. Actually, however, the gear shift mechanism 1 is not switched into the state of the 4th speed at this time because, owing to the setting of the time T2, the time during which the 4th speed signal is output is limited to a range wherein no actual engagement occurs prior to the end of the piston stroke of the servo means for the clutch C-2.

In summary, if the operation of the 2–3 timing valve 23 malfunctions due to sticking or the like upon 2–3 shifting, the illustrated embodiment can avoid an excessive thermal load on the engaged-side frictional engagement element B-2 due to over tie-up by temporarily changing the hydraulic circuit into the state of the 4th speed and promptly releasing the released-side frictional engagement element B-3 upon detection of the over tie-up, so that the gear shift mechanism is protected from deterioration, seizure and the like. Since the various sensors 4, the electronic control unit 3 and the various valves in the hydraulic control unit 2, which are required to perform the control described above, are all conventionally present in an automatic transmission, it is unnecessary to add any significant new element to the transmission to perform the above control operations. It is possible to provide the control of the present invention by simply modifying the program of the electronic control unit 3 and the configurations of the 3-4 shift valve and also adding the drain line $L_d$.

The present invention has been described in detail on the basis of an embodiment applied to a 5-speed automatic transmission. It is however to be noted that the application of the present invention is not limited to such a transmission. Detection of tie-up can also be achieved as follows:

(1) Detection of excessive time from the output of a shift signal until the speed of revolution begins to change.

(2) Detection of an output torque and an acceleration of an internal member of a transmission equal to or smaller than predetermined values, respectively, relative to an input torque.

(3) Detection of an accumulator stroke of an engaged-side frictional engagement element equal to or greater than a predetermined value.

(4) Detection of forward or rearward acceleration G of a vehicle, twisting of a power plant, thrust of a planetary gear, or the like.

As is understood from the foregoing, the specific construction of the individual parts is not limited to the above-described embodiment but can be modified or changed in various ways within the scope of the claims.

We claim:

1. In a hydraulic control system for an automatic transmission having a gear shift mechanism with a first frictional engagement element adapted to be engaged to achieve a first specific speed stage and a second frictional engagement element adapted to be engaged to achieve a second specific speed stage faster than and closest to the first specific speed stage, wherein the hydraulic control system comprises a hydraulic control unit for controlling engagement and release of said first and second frictional engagement elements of said gear shift mechanism by feeding hydraulic pressure thereto or discharging hydraulic pressure therefrom, and an electronic control unit for controlling said hydraulic control unit by solenoid signals, said hydraulic control unit comprising a first directional control valve for switching feeding of hydraulic pressure to one of said first and second frictional engagement elements and discharge of hydraulic pressure from the other, responsive to a first solenoid signal outputted from said electronic control unit, and a second directional control valve adapted to be switched by a second solenoid signal output from said electronic control unit to achieve a third speed stage still faster than the second speed stage, the improvement comprising:

a discharge line connecting said first frictional engagement element to a drain line via said second directional control valve;

gear shift sensor means for sensing a gear shift; and tie-up determination means for determining tie-up of one or both the frictional engagement elements from a detection signal from gear shift sensor means, whereby upon determination of tie-up by said tie-up determination means, said second solenoid signal is output to said second directional control valve.

2. A hydraulic control system according to claim 1, wherein said hydraulic control unit further comprises directional control valve actuation means for generating a solenoid signal pressure, responsive to the second solenoid signal from said electronic control unit, to actuate said second directional control valve to achieve the third speed stage by positioning said second directional control valve to establish communication between said discharge line and said drain line.

3. A hydraulic control system according to claim 1, wherein said electronic control unit comprises speed stage switching means for outputting the second solenoid signal upon determination of tie-up to achieve the third speed stage.

4. A hydraulic control system according to claim 3, wherein said speed stage switching means has timer means for outputting the first solenoid signal upon lapse of a predetermined time after the output of the second solenoid signal.

5. A hydraulic control system according to claim 4, wherein the predetermined time of said timer means is set in a range so that the third speed stage is not achieved.

6. A hydraulic control system according to claim 1, wherein said sensor means comprises an input shaft revolution sensor for detecting the number of revolutions of an input shaft and an output shaft revolution sensor for detecting the number of revolutions of an output shaft.

7. A hydraulic control system according to claim 6, wherein said electronic control unit has means for setting a boundary value for the determination of tie-up on the basis of the number of revolutions of the output shaft determined by said output shaft revolution sensor, whereby over tie-up is determined based on the boundary value, the number of revolutions of the input shaft detected by the input shaft revolution sensor and the number of revolutions of the output shaft detected by the output shaft revolution sensor.

* * * * *

UNITED STATES PATENT AND TRADEMARK OFFICE
CERTIFICATE OF CORRECTION

PATENT NO. : 5,472,389
DATED : December 5, 1996
INVENTOR(S) : ANDO et al

It is certified that error appears in the above-indentified patent and that said Letters Patent is hereby corrected as shown below:

Column 3, line 14, after "means" insert --taking into consideration angular acceleration, a constant K, and output shaft torque, respectively--.

Signed and Sealed this

Twelfth Day of November, 1996

Attest:

BRUCE LEHMAN

Attesting Officer     Commissioner of Patents and Trademarks